United States Patent

Lyon et al.

[11] Patent Number: 5,392,517
[45] Date of Patent: Feb. 28, 1995

[54] METHOD OF MAKING A RING GEAR

[75] Inventors: James W. Lyon; Henry J. Cameron, Grand Blanc, both of Mich.

[73] Assignee: General Motors Corporation, Detroit, Mich.

[21] Appl. No.: 178,995

[22] Filed: Jan. 7, 1994

[51] Int. Cl.$^6$ ............................................. B21D 53/28
[52] U.S. Cl. ............................................. 29/893.36
[58] Field of Search ................... 29/893, 893.3, 893.35, 29/893.36

[56] References Cited

U.S. PATENT DOCUMENTS 1,632,818  6/1927  Black ............................. 29/893.36
3,839,892  10/1974  Andreissen ........................ 72/30

Primary Examiner—P. W. Echols
Attorney, Agent, or Firm—Donald F. Scherer

[57] ABSTRACT

A ring gear is formed from a blank taken from a hot extruded tube stock. The tube stock is extruded to predetermined dimensions substantially smaller than the finished ring gear blank. A toroidal blank is cut from the tube stock and measured to determine the mass thereof. The blank is expanded by rolling it to new inner and outer diameters and width after which a set of gear teeth are formed on the periphery of the expanded blank.

9 Claims, 2 Drawing Sheets

METHOD OF MAKING A RING GEAR

TECHNICAL FIELD

This invention relates to the manufacture of gear members. More particularly, this invention relates to a method for manufacturing ring gears from a toroidal blank.

BACKGROUND OF THE INVENTION

Ring gears have been formed using different methods in manufacturing processes. One such process is to utilize a length of bar stock which is rolled or otherwise formed into a coil, after which, the coils are cut by a saw to provide a plurality of open ended rings. The open ends of the ring are welded together and the weld excess is trimmed from the blank. The blank is then coined and sized and the teeth are hobbed into the periphery of the ring blank.

Another method of manufacturing a gear is described in U.S. Pat. No. 1,632,818 issued Jun. 21, 1927, to Black. The method utilized by Black is to cut a toroidal blank from a tube stock after which a ring gear or blank is forced to the size of the final ring gear member, and the teeth are cut into the ring gear blank.

SUMMARY OF THE INVENTION

The present invention utilizes steel tubing which has been hot extruded to provide a tube of predetermined inner and outer diameters. The tube is cut to provide toroidal blanks which are weighed to determine the mass of each toroidal blank. Utilizing the mass information and the final gear dimensions required, the toroidal blank is placed in a ring rolling machine which rolls the ring blank to a new set of dimensions determined by the mass of the beginning blank.

The new dimensions are formed such that the periphery on which the gear teeth are to be formed is slightly greater than the desired diameter at the tip of the gear teeth. Thus, the nonmachined diameter is rolled to a controlled finished diameter, the width is formed to its desired finished dimension, and the other diameter of the blank is cut with a full tooth forming device, such as a top hobbing mechanism, to provide the finished gear member.

It has been found that not only does this process reduce the time required to form a gear, but also reduces the time required to change the machinery from producing one size gear to another size gear. This is particularly useful in the making of engine flywheels wherein the various engine sizes require different flywheel ring gear sizes.

It is an object of this invention to provide an improved method of manufacturing a ring gear from an extruded tube blank.

It is a further object of this invention to provide an improved method of manufacturing a ring gear wherein a toroidal blank is cut from a hot extruded tube stock and then measured to determine the mass and finally rolled to the final blank dimensions. Following the rolling, the gear teeth are cut into one surface of the blank to form the finished gear product.

These and other objects and advantages of the present invention will be more apparent from the following description and drawings.

DESCRIPTION OF AN EXEMPLARY EMBODIMENT

Figure 1:
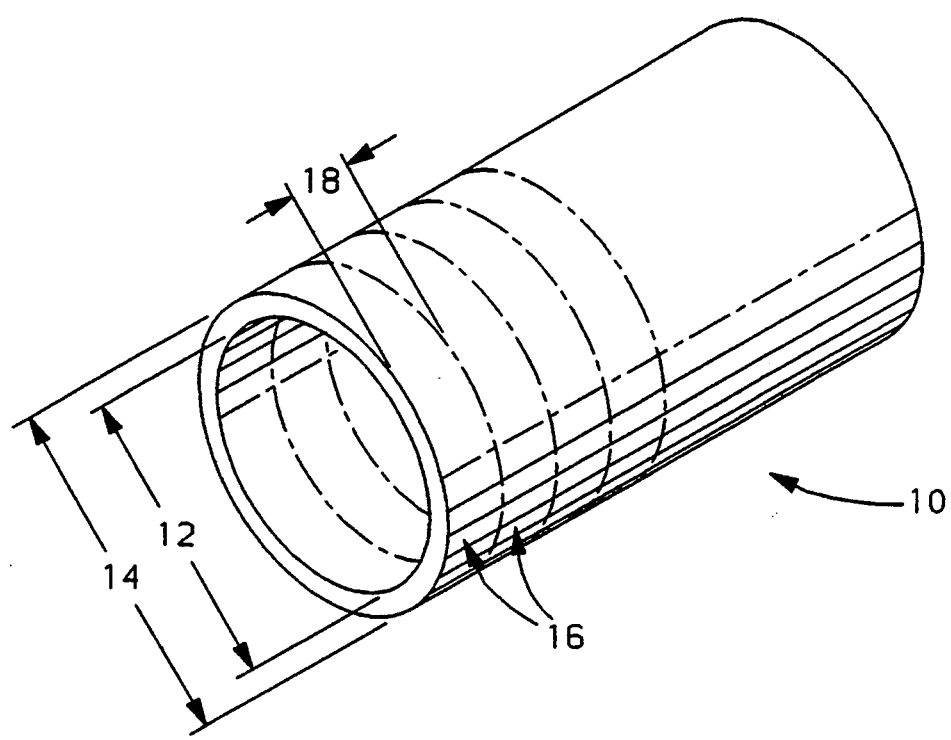
FIG. 1 is a perspective view of a hot extruded tube blank.

As can be seen in FIG. 1, a hot extruded tube blank 10 is provided. This blank 10 is extruded to have an inside diameter 12 and an outside diameter 14 which are extruded to predetermined dimensions. For example, the inside diameter 12 might have a mean dimension of 7.375 inches and the outside diameter 14 might have a mean dimension of 8.625 inches.

The tube blank 10 is cut with a mill cutter or precision saw to provide a plurality of toroidal blanks 16. Each toroidal blank 16 has a width 18. The width 18 is substantially equal to a mean dimension of 0.445 inches when the diameters 12 and 14 are extruded as described above. Each blank 16 is then measured to determine the mass or weight thereof. The weight of the blank is approximately 2.2078 pounds when the aforementioned dimensions are present.

Figure 2:
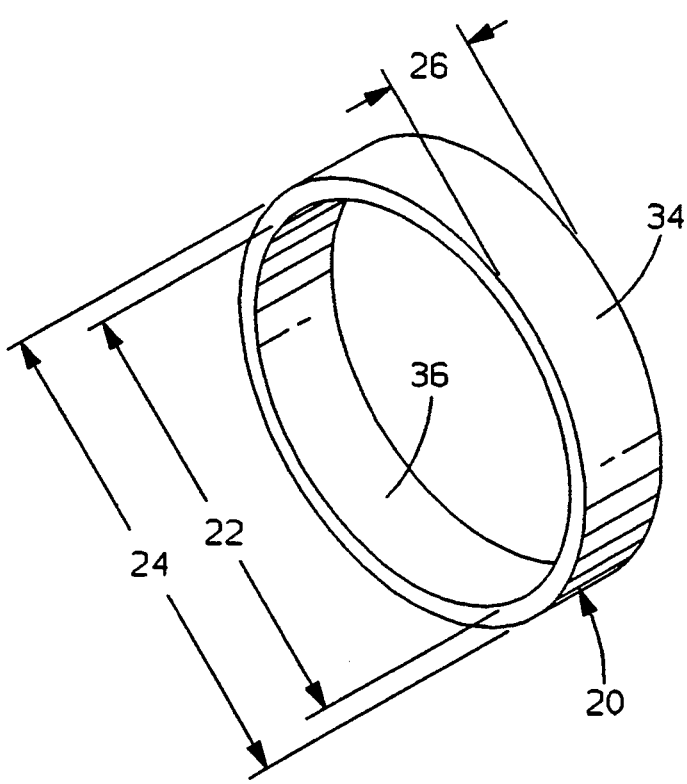
FIG. 2 is a perspective view of a gear blank that has been cut from the hot extruded tube and rolled to size for the finished gear blank.

Given the weight of each blank 16, the finished inside and outside diameters can be determined, as well as the finished width. With the present example given, the blank 16 is placed in a rolling machine and expanded to a gear blank 20 shown in FIG. 2. The gear blank 20 is worked in the rolling machine until the inside diameter 22 is at eleven inches and the outside diameter 24 is at twelve inches when the mean weight is present. Also during the rolling process, the width of the blank 16 is expanded to provide a new width 26 which is approximately 0.453 inches.

Figure 3:
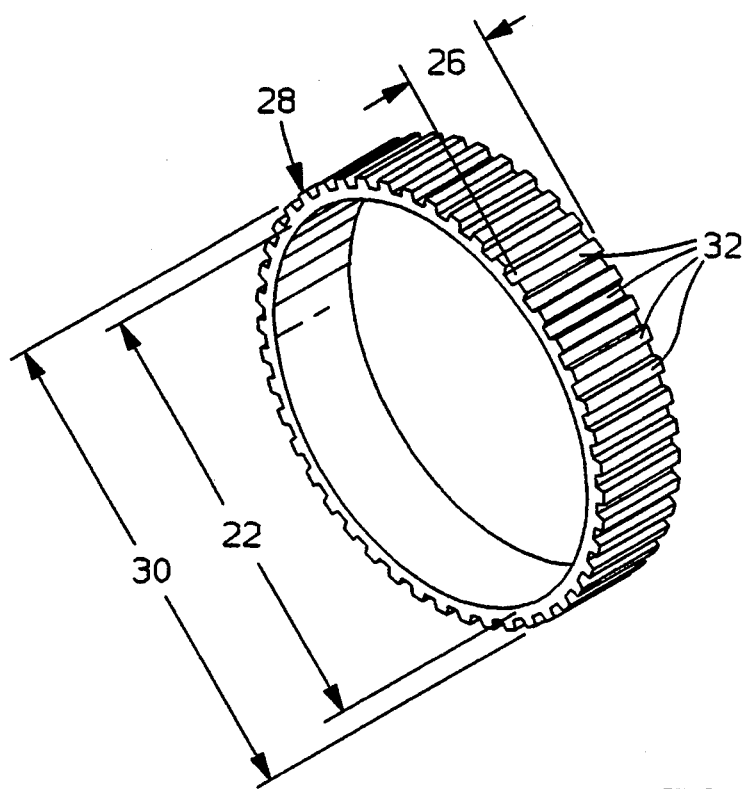
FIG. 3 is a perspective view of a gear member formed from the gear blank shown in FIG. 2.

The inside diameter 22 and the cylindrical periphery associated therewith and the width 26 are equal to the desired finished dimensions of a gear 28 shown in FIG. 3. The outside diameter 24 is larger than the toothed tip diameter 30 of the gear shown in FIG. 3. By utilizing a top hobbing process, which cuts a full gear tooth, such as 32, the material is trimmed from the outer periphery 34 of the blank 20, thereby reducing the outside diameter 24 to the desired finished toothed tip diameter 30. This permits the manufacture of a gear member having precision dimensions with a very simple process.

In the alternative, the gear teeth 32 may be cut on the inside diameter 22 along the periphery 36. Such a gear might be used as a ring gear in a planetary gear power transmission or as a synchronizer sleeve in a synchronizer clutch assembly. If the gear tooth is to be cut on the periphery 36, the outer diameter 24 will be rolled to the desired finished diameter and the inner diameter 22 will be slightly smaller than the desired tip diameter of the teeth to be cut into the periphery 36.

Figure 4:
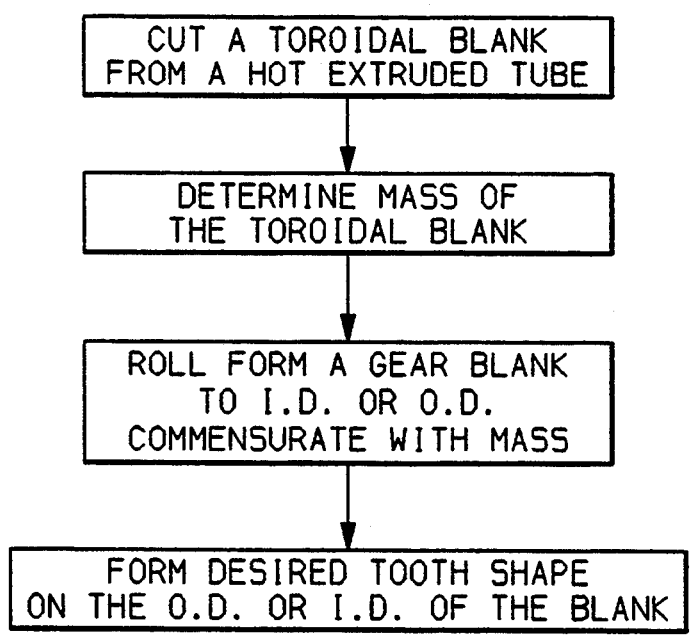
FIG. 4 is a flow chart of the process utilized in forming the gear member shown in FIG. 3.

As seen in FIG. 4, the gear is manufactured by cutting a toroidal blank from a hot extruded tube followed by the determination of the mass of the toroidal blank. The toroidal blank is then rolled to form a gear blank to a desired inside or outside diameter commensurate with the mass of the blank. The gear blank is then placed in a hobbing machine or other tooth cutting machine, where the finished tooth shape is cut on either the outside diameter or inside diameter of a blank.

The determination of mass permits an accurate determination of the final inside and outside diameter of the gear blank prior to rolling. During the rolling process, the toroidal blanks 16 are expanded outwardly along their radii and also expanded axially, such that the width 18 increases to a desired finished width 26. Since the finished gear is to have a desired tooth tip diameter, the mass determination is useful in establishing the appropriate sizes of diameters 22 and 24, such that the proper gear form can be manufactured in the gear blank. When the gear teeth are to be cut in the outside diameter, the mass is used to calculate the finished inside diameter such that the outer diameter will be at least slightly greater than the finished tooth tip diameter.

The embodiments of the invention in which an exclusive property or privilege is claimed are defined as follows:

1. A method of making a ring gear comprising:
   (a) providing a hot extruded tube having a cylindrical inner surface and a cylindrical outer surface each having diameters within predetermined ranges;
   (b) cutting a toroidal blank from the tube to a width within a predetermined range;
   (c) determine the mass of the toroidal blank, and a desired finish diameter of one of the cylindrical surfaces in accordance with the mass;
   (d) roll forming the toroidal blank until the one of the cylindrical surfaces has the predetermined diameter commensurate with the mass; and
   (e) forming a desired complete tooth shape on the other of the cylindrical surface of the roll formed toroidal blank.

2. The method of making a ring gear defined in claim 1, wherein the toroidal blank is roll formed to an increased width simultaneous with the roll forming of the one cylindrical surface.

3. The method of making a ring gear defined in claim 2, wherein the toroidal blank is roll formed to provide a change in diameter of the other cylindrical surface simultaneous with the roll forming of the one cylindrical surface.

4. A method of making a ring gear comprising:
   (a) providing a hot extruded tube having a cylindrical inner surface and a cylindrical outer surface each having a diameter within predetermined ranges;
   (b) cutting a toroidal blank from the tube to a width within a predetermined range;
   (c) determine the mass of the toroidal blank, and a finish diameter for the inner cylindrical surface commensurate with the mass;
   (d) roll forming the toroidal blank until the cylindrical inner surface has the predetermined finish diameter commensurate with the mass; and
   (e) forming a desired complete tooth shape on the cylindrical outer surface of the roll formed toroidal blank.

5. The method of making a ring gear defined in claim 4, wherein the toroidal blank is roll formed to an increased width simultaneous with the roll forming of the cylindrical inner surface.

6. The method of making a ring gear defined in claim 5, wherein the toroidal blank is roll formed to provide a change in diameter of the cylindrical outer surface simultaneous with the roll forming of the cylindrical inner surface.

7. A method of making a ring gear comprising:
   (a) providing a hot extruded tube having a cylindrical inner surface and a cylindrical outer surface each having a diameter within predetermined ranges;
   (b) cutting a toroidal blank from the tube to a width within a predetermined range;
   (c) determine the mass of the toroidal blank, and a finish diameter for the cylindrical outer surface commensurate with the mass;
   (d) roll forming the toroidal blank until the cylindrical outer surface has the predetermined finish diameter commensurate with the mass; and
   (e) forming a desired complete tooth shape on the cylindrical inner surface of the roll formed toroidal blank.

8. The method of making a ring gear defined in claim 7, wherein the toroidal blank is roll formed to an increased width simultaneous with the roll forming of the cylindrical outer surface.

9. The method of making a ring gear defined in claim 8, wherein the toroidal blank is roll formed to provide a change in diameter of the cylindrical inner surface simultaneous with the roll forming of the cylindrical outer surface.

* * * * *